Patented Nov. 16, 1948

2,453,953

UNITED STATES PATENT OFFICE 2,453,953

PROCESS FOR PREPARING SULFUR-CONTAINING PHTHALOCYANINE DYESTUFFS

Clifford Wood, Blackley, Manchester, England, assignor to Imperial Chemical Industries Limited, a corporation of Great Britain No Drawing. Application March 4, 1946, Serial No. 651,973. In Great Britain March 5, 1945

5 Claims. (Cl. 260—314.5)

This invention relates to the manufacture of new sulphur-containing dyestuffs.

According to this invention there is provided a process for the manufacture of new sulphur-containing dyestuffs which comprises heating a metal or metal-free phthalocyanine which contains at least one —$SO_2Cl$ group with a phosphorus sulphide or with substances capable of giving rise to a phosphorus sulphide.

There may be used as starting materials in the process of this invention for example copper phthalocyanine tetra-(4)-sulphonyl chloride and metal-free phthalocyanine trisulphonyl chloride.

As a phosphorus sulphide there may be used for example phosphorus pentasulphide. As substances capable of giving rise to a phosphorus sulphide there may be used for example red phosphorus and sulphur.

The reaction is brought about as said by heating the reactants together. This may conveniently be effected in a solvent. A suitable solvent for this purpose is nitrobenzene. Reaction generally starts in at about 130° C., whereupon the temperature rises spontaneously due to heat of reaction. The reaction may then be continued at any desirable temperature up to the boiling point of the solvent, which in the case of nitrobenzene is about 210° C.

The products obtained according to the process of the invention are soluble in aqueous sodium sulphide solutions. When cotton is immersed in these solutions and subsequently exposed to oxidising conditions as in the normal method of dyeing with sulphur dyestuffs it is dyed in blue or green shades which possess good fastness properties, particularly to wet treatments. From this behavior it is assumed that the above reaction effects replacement of the sulfonyl-chloride radicals by mercapto groups. The product may be isolated in this form, or may be treated further with alkalis to convert the mercapto groups into the corresponding alkali-metal mercaptides.

The invention is illustrated but not limited by the following examples in which the parts are by weight.

*Example 1*

10 parts of copper phthalocyanine tetra-(4)-sulphonyl chloride (obtainable by heating tetrapotassium copper phthalocyanine tetra-(4)-sulphonate with phosphorus pentachloride in nitrobenzene) are heated with 20 parts of phosphorus pentasulphide and 25 parts of nitrobenzene at 170–180° C. during 45 minutes. The mixture is then cooled, 50 parts of alcohol are added and the green suspension so obtained is filtered and the residual solid washed first with alcohol and then with water and finally dried. The so obtained green powder dissolves in hot dilute aqueous sodium sulphide solution yielding a bluish grey solution. Cotton is dyed from this solution in grey to black shades, which on being allowed to oxidise in the air become bright green. These green shades have good fastness to wet treatments and to light.

*Example 2*

10 parts of the trisodium salt of metal free phthalocyanine trisulphonic acid (obtainable by sulphonating metal-free phthalocyanine) are heated with 60 parts of nitrobenzene and 30 parts of phosphorus pentachloride at 170–180° C. during 30 minutes, and the greenish blue solution so obtained is filtered while still hot to remove some insoluble matter. The residual solid is washed with 100 parts of hot nitrobenzene in several successive portions and to the combined filtrate and washings containing in solution metal free phthalocyanine trisulphonyl chloride are added 30 parts of phosphorus pentasulphide and the mixture is then heated at 170–175° C. during 30 minutes. The so-obtained yellowish-green suspension is filtered and the residual solid is washed with alcohol. The filter-cake is suspended in 400 parts of water, 20 parts of soda ash are added, and the mixture is boiled during 30 minutes. The resultant suspension is filtered and the residue washed until alkali-free with water. The product is then dried and a bright yellowish-green powder is thus obtained. This material dissolves in hot aqueous sodium sulphide solution, yielding a bluish-grey solution which dyes cotton in bluish-grey to greenish grey shades, which when exposed to atmospheric oxidation become bright yellowish green. These green shades have good fastness to wet treatments and to light.

*Example 3*

10 parts of metal-free phthalocyanine trisulphonyl chloride (made by treating with phosphorus pentachloride in nitrobenzene solution the trisodium salt of metal-free phthalocyanine trisulphonic acid, itself obtained by sulphonating metal-free phthalocyanine) are heated with 13 parts of phosphorus pentasulphide and 100 parts of nitrobenzene to about 130° C. when a reaction takes place and the temperature rises rapidly to about 200° C. The green suspension so obtained is filtered whilst still hot and the residual solid is washed with alcohol. The filter-cake is then suspended in water and the suspension is heated at 90–100° C. and caustic soda is added cautiously until the mixture is just alkaline to Clayton Yellow. Heating is continued during 30 minutes after the addition is complete and the green suspension is then filtered and the solid is washed free from alkali. It is then dried to give a dark green powder which dissolves in hot dilute aqueous sodium sulphide giving a greyish blue solution. This solution dyes cotton in greyish blue shades which oxidise in air to bright green shades of good fastness to washing and to light.

*Example 4*

A mixture of 9 parts of metal-free phthalocyanine trisulphonyl chloride, 4.6 parts of red phosphorus, 12 parts of powdered sulphur and 100 parts of nitrobenzene is boiled and stirred for 1½ hours. The mixture is then cooled and the resulting green suspension is filtered. The filter-cake is washed first with ethanol, then with water and then dried. The product is a dark green powder which dissolves in hot aqueous sodium sulphide solution to give a dark blue solution. This solution dyes cotton in dark blue shades which become bright yellowish-green on exposure to air.

I claim:

1. Process for the manufacture of vattable, sulfur-containing dyestuffs of the phthalocyanine series, which comprises heating in nitrobenzene, at a temperature between 130° and 210° C., a phthalocyanine compound selected from the group consisting of metal- and metal-free phthalocyanines containing sulphonyl-chloride groups, in the presence of a phosphorus polysulfide selected from the group consisting of phosphorus pentasulfide and the sulfides formed in situ at the specified reaction temperature from a mixture of red phosphorus and sulfur, whereby to convert the sulfonyl-chloride radicals of the phthalocyanine compound into vattable, sulfur-containing radicals.

2. Process for the manufaceure of vattable, sulfur-containing dyestuffs of the phthalocyanine series, which comprises heating in nitrobenzene, at a temperature between 130° and 210° C., a copper phthalocyanine compound containing at least one —$SO_2Cl$ group, in the presence of phosphorus pentasulfide, whereby to replace the —$SO_2Cl$ radicals by vattable, sulfur-containing radicals.

3. Process for the manufacture of vattable, sulfur-containing dyestuffs of the phthalocyanine series, which comprises heating in nitrobenzene, at a temperature between 130° and 210° C., a metal-free phthalocyanine compound containing at least one —$SO_2Cl$ group, in the presence of phosphorus pentasulfide, whereby to replace the —$SO_2Cl$ radicals by vattable, sulfur-containing radicals.

4. Process for producing a vattable sulfur dye of the phthalocyanine series, which comprises heating a solution of copper-phthalocyanine-tetra-(4)-sulphonyl chloride in nitrobenzene jointly with phosphorus pentasulfide, at a tempertaure of about 170°–180° C., whereby to convert to —$SO_2Cl$ radicals into vattable, sulfur-containing radicals.

5. Process for producing a vattable sulfur dye of the phthalocyanine series, which comprises heating a solution of metal-free phthalocyanine-trisulfonyl chloride in nitrobenzene jointly with phosphorus pentasulfide, at a temperature of about 170°–210° C., whereby to convert the —$SO_2Cl$ radicals into vattable, sulfur-containing radicals.

CLIFFORD WOOD.

No references cited.